United States Patent [19]

Hucul

[11] Patent Number: 5,028,665
[45] Date of Patent: Jul. 2, 1991

[54] POLYMER HYDROGENATION CATALYSTS

[75] Inventor: Dennis A. Hucul, Midland, Mich.

[73] Assignee: The Dow Chemical Company, Midland, Mich.

[21] Appl. No.: 294,452

[22] Filed: Jan. 9, 1989

[51] Int. Cl.$^5$ ............................................... C08F 8/04
[52] U.S. Cl. ................................. 525/339; 525/332.8; 525/332.9; 525/333.1; 525/333.2
[58] Field of Search ........................................ 525/339

[56] References Cited

U.S. PATENT DOCUMENTS

| | | |
|---|---|---|
| 3,433,845 | 3/1969 | Kovach et al. . |
| 3,484,421 | 12/1969 | Pine et al. . |
| 3,598,886 | 8/1971 | Hoeg et al. . |
| 3,994,868 | 11/1976 | Inomata et al. . |
| 4,057,601 | 11/1977 | Moczygemba . |
| 4,076,914 | 2/1978 | Moczygemba et al. . |
| 4,168,286 | 9/1979 | Moczygemba . |
| 4,337,329 | 6/1982 | Kubo et al. . |
| 4,412,087 | 10/1983 | Trepka . |
| 4,452,951 | 6/1984 | Kubo et al. . |
| 4,464,515 | 8/1984 | Rempel et al. . |
| 4,503,196 | 3/1985 | Rempel et al. . |
| 4,567,251 | 1/1986 | Balas . |
| 4,629,767 | 12/1986 | Shyr et al. . |
| 4,656,230 | 4/1987 | Shyr et al. . |

OTHER PUBLICATIONS

Nitto Electric Ind KK Japanese Patent J6 1255 970-A.
Chemical Abstracts 95:151487b.
Chemical Abstracts 106:19226g.

Primary Examiner—Bernard Lipman
Attorney, Agent, or Firm—Price, Heneveld, Cooper, DeWitt & Litton

[57] ABSTRACT

The hydrogenation of unsaturated polymers is effected employing a heterogeneous catalyst comprising a Group VIII metal and a porous support wherein the porous support is characterized by a pore size distribution such that at least 95% of the pore volume is defined by pores having diameters greater than 450 angstroms and the ratio of metal surface area to carrier surface area is in the range from about 0.07-0.75:1.

18 Claims, No Drawings ns. In particular, two examples are given of selec-

POLYMER HYDROGENATION CATALYSTS

BACKGROUND OF THE INVENTION

The present invention relates to heterogeneous catalysts for hydrogenation of unsaturated polymers, particularly higher molecular weight polymers, e.g., having molecular weights in the range from about 65,000 to about 500,000.

Polymers containing ethylenic and aromatic unsaturation such as styrene-isoprene-styrene and styrene-butadiene-styrene triblock copolymers have broad commercial use in adhesive formulations, footwear and as polymer modifiers Such copolymers contain one unit of ethylenic unsaturation for each unit of diene in the final polymer. The ethylenic unsaturation provides sites for chemical reactions to occur making the polymer susceptible to thermal degradation, oxidative degradation, instability under ultraviolet radiation and general poor weatherability.

Polymers that have the ethylenically unsaturated region saturated via hydrogenation have greatly improved stability and weathering properties because the reactive site of ethylenic unsaturation is removed. Hydrogenation may also improve some of the physical properties of thes polymers, see, for example, British Patent 1,229,573 and U.S. Pat. No. 3,333,024. However, hydrogenation of the aromatic unsaturation can have deleterious effects on polymer properties, such as a loss of rubber-like characteristics. Thus, it is desirable that the hydrogenation be selective to saturation of the ethylenically unsaturated region with minimal hydrogenation of the aromatic region.

Both homogeneous and heterogeneous catalyst systems have been widely used for the hydrogenation of ethylenically unsaturated polymers. Homogeneous catalytic processes are disclosed in U.S. Pat. Nos. 3,595,295; 3,595,942; 3,700,633 and 3,810,957, as well as in "Polymer Hydrogenations With Soluble Lithium/Cobalt And Aluminum/Cobalt Catalysts"; J. C. Falck, Catalysis In Organic Synthesis, E. D. PN Rylander and H. Greenfield, Academic Press, New York, 1976, pp. 305-24. Homogenous catalysts can be highly selective with respect to effecting hydrogenation of ethylenically unsaturated moieties. These catalysts exist in the same phase as the reaction mixtures, which makes their separation from the hydrogenated polymer difficult and adds significantly to process costs.

The heterogeneous catalysts, on the other hand, exist as a phase distinct from the reaction mixture, and their separation from the hydrogenated polymer is more easily accomplished. Unfortunately, extensive hydrogenation of the aromatic region typically occurs along with hydrogenation of the ethylenically unsaturated region when heterogeneous catalyst systems are used to hydrogenate the polymer. This is shown in a number of patents and confirmed by our studies on commercial catalysts, see U.S. Pat. Nos. 3,333,024; 3,415,789; Belgium Patent BE871348 and British Patent GB 2,011,911.

Considerable research has been directed to the development of heterogeneous catalyst systems which would more selectively hydrogenate the ethylenically unsaturated region while reducing the hydrogenation of the aromatic region. One such approach is described in French Patent 2,468,618 (British equivalent GB 2,061,961). This patent describes the use of a 5% rhodium/activated carbon catalyst as a selective hydrogenation catalyst for a number of aromatic-diene copolymer systems. In particular, two examples are given of selective hydrogenation of triblock copolymers. Examples 3 and 8 of the French patent indicate selective hydrogenation with triblock copolymers whose molecular weight is 60,000. Our studies indicate that a 5% rhodium/activated carbon catalyst employing an activated carbon having an average particle size of 20-40 microns and a surface area of 1,100 square meters per gram has poor, nonselective activity for hydrogenation of a commercial styrene-butadiene-styrene block copolymer whose average molecular weight is 177,000. The poor activity is also independent of catalyst particle size with particle sizes as small as 5 microns. Although this catalyst may have some use for low molecular weight polymers, it is not useful for higher molecular weight polymers and falls outside the range of catalysts specified later in this invention.

A second approach which describes a process for the selective hydrogenation of ethylenic-aromatic unsaturated polymer systems is U.S. Pat. No. 4,501,685. This reference describes a system in which a poison is added to the feed to moderate the activity of the catalyst, thereby giving good selectivity for hydrogenation of the olefin region without hydrogenation of the aromatic region. The best results reported show that the aromatic hydrogenation is about one-half of the total hydrogenation, i.e., at 68% olefin hydrogenation, the aromatic hydrogenation is 34%. Extrapolating these results to almost quantitative conversion of the olefin would lead one to expect at least 50% hydrogenation of the aromatic region. This is not a very selective process. There is also a good possibility that some of the poison may end up in the polymer causing detrimental effects on its properties.

Another patent, U.S. Pat. No. 4,560,817, describes selective hydrogenation catalysts for ethylenically-aromatic unsaturated polymer systems. This reference also describes the use of poisons to alter the selectivity of hydrogenation catalysts. Specifically, lithium methoxide ($LiOCH_3$) or ammonia are used as poisons to moderate the activity of the catalyst. For the reaction to be effective, the hydrogenation must be conducted at temperatures where polymer degradation occurs, e.g., 160°-167° C. When the hydrogenation is effected at a lower temperature, e.g., 102° C., only a small amount of the unsaturation, in the range of 16%, is converted.

U.S. Pat. No. 4,452,951 discloses a process for producing hydrogenated conjugated diene polymers employing a heterogeneous catalyst comprising porous silica having a specific surface area of not more than 600 square meters per gram and an average pore diameter of from 80-1,200 angstroms as a carrier for the hydrogenation catalyst, which can be any of the metallic or non-metallic catalysts which have hydrogenating ability. The pore volumes which are recited appear to be a mix of calculated values, as in Example 1, and measured, as in Example 4. While the reference does teach catalyst supports having average pore diameters of 1200 angstroms, it does not teach pore size distribution as an important criterion.

SUMMARY OF THE INVENTION

The heterogeneous catalyst systems of the present invention comprise a carrier having an actual or measured pore diameter of sufficient size to provide a pore size distribution such that at least 95% of the pore volume is defined by pores having diameters greater than 450 angstroms. Preferably, 90% of the pore volume is made up of pores having diameters greater than 1,000 angstroms and most preferably, in the range from 10,000 to 50,000 angstroms. These are exceptionally large pores for catalyst carriers since artisans are conditioned to maximize surface area by using a carrier of significantly smaller pore size. In addition, U.S. Pat. No. 4,452,951 teaches that the use of a support having average pore diameters exceeding 1,200 angstroms is so reduced in strength that it is broken during hydrogenation or catalyst separation and the separation of the catalyst becomes difficult.

A second requirement for the heterogeneous catalyst of the present invention is a very high ratio of metal surface area to carrier surface area. The ratio of metal surface area to carrier surface area of the present catalyst is in the range from about 7–75%, more preferably 10–50%. This compares with the rhodium/activated carbon catalyst specified in GB 2,061,961 and the palladium/activated carbon catalyst in U.S. Pat. No. 4,501,685 which have metal surface areas of 0.5–1.5% of the surface areas of the support. This is also different from the palladium/alumina catalyst specified in U.S. Pat. No. 4,560,817 which has maximum metal surface areas of 2–5%. The high surface area of the metal compared to the support gives a high metal site density on the catalyst. The extremely high metal surface area to the support surface area is in direct contradiction to the disclosure of U.S. Pat. No. 4,337,329 which teaches, at column 2, lines 16–22, that if the amount of catalytic agent supported on the carrier is too large, dispersion of the metals on the carrier becomes poor, and the diameter of the metal particles increases to reduce the catalytic activity of the resulting catalyst.

This invention describes the synthesis of unique heterogeneous catalysts for hydrogenation processes broadly and which are especially useful in selective polymer hydrogenations, such as are required in hydrogenating ethylenically unsaturated regions with a minimal amount of aromatic unsaturation hydrogenation. These catalysts are very active under mild temperature conditions, from room temperature to 140° C., but preferably from 50°–110° C. The catalysts are capable of almost complete conversion of the ethylenic unsaturation region, in a range from 90–100%, with minimum hydrogenation of the aromatic region from 0–25%, but typically about 7%. They are also useful for hydrogenation of copolymers with molecular weights ranging from 65,000–500,000, preferably in the range from 150,000–500,000, and most typically around 175,000.

PREFERRED EMBODIMENT OF THE INVENTION

In the ensuing discussion, for simplicity and convenience, the invention has been directed as being applicable to the hydrogenation of polymeric materials containing both ethylenic and aromatic unsaturation. However, it should be understood that the invention is equally applicable to other unsaturated materials which normally would be subjected to hydrogenation with heterogeneous catalyst systems.

The unique heterogeneous catalyst compositions of the present invention comprise at least on Group VIII metal with palladium, rhodium, ruthinium, cobalt, nickel and platinum being currently preferred, on a porous, powdery or granular carrier or support material.

Substantially any of the known heterogeneous catalyst carriers, such as diatomaceous earth, alumina, activated carbon, silica alumina or silica, can be employed in the practice of this invention; providing, however, that at least 95% of the pores have a measured pore diameter greater than 450 angstroms and, more preferably, that at least 90% of the pores have a measured pore diameter greater than 1,000 angstroms, most preferably in the range from 10,000–50,000 angstroms. In this regard, it is pointed out that while there is no reason to exclude silica as an effective support for the current heterogeneous catalyst, none of the currently commercially available silicas are acceptable because their measured pore diameters are all too small and do not fit the foregoing measured pore diameter, that is, pore size distribution, limitations. However, there is no reason to suspect that a silica having the required measured pore diameter would not be acceptable. Providing that the support has the proper measured pore diameter, there is no particular other limitation to be imposed on it. Thus, appropriate supports include materials used for humidity control, moisture-proofing, gas chromatography, thin-layer chromatography, column chromatography and liquid chromatography. The supports may be powdery, spherical or molded.

Specific support materials are a diatomaceous earth support (Johns Manville Celite ® F.C.); alumina (Rhone-Poulenc SCM 9X) and an activated carbon (City Service Raven MT-P). These supports have the following physical characteristics:

|  | SUPPORT | | |
|---|---|---|---|
|  | Johns Manville Celite F.C. | Rhone-Poulenc SCM-9X Al$_2$O$_3$ | City Service Raven MT-P Ca. |
| Surface Area (m$^2$/g) | 2.5–3.5 | 10–15 | 6–10 |
| Pore Volume (cc/g) | 1.8 | 0.7 | 0.4 |
| Pore Distribution (Å) | | | |
| >10,000 | 99 | 15 | 7 |
| 1,000–10,000 | 1 | 80 | 82 |
| 500–1,000 |  | 5 | 11 |
| 100–500 |  |  |  |
| 20–100 |  |  |  |
| 0–20 |  |  |  |

Among supports which have been evaluated and found unsatisfactory are alumina (Calsicat SD and Norton 6175); silica (Davison 57) and activated carbon (Pittsburgh CPG). These supports have the following physical characteristics:

|  | SUPPORT | | | |
| --- | --- | --- | --- | --- |
|  | Calsicat SD $Al_2O_3$ | Norton 6175 $Al_2O_3$ | Davison 57 $SiO_2$ | Pittsburg CPG Carbon |
| Surface Area (m²/g) | 30–40 | 230–290 | 275–325 | 900–1100 |
| Pore Volume (cc/g) | 0.8 | 0.9 | 1.1 | 0.8 |
| Pore Distribution (Å) | | | | |
| >10,000 | 1 | | | |
| 1,000–10,000 | 22 | 8 | 1 | 12 |
| 500–1,000 | 36 | 3 | 3 | 10 |
| 100–500 | 40 | 21 | 80 | 9 |
| 20–100 | 1 | 68 | 15 | 27 |
| 0–20 | | | | 42 |

Catalyst properties, e.g., particle size, porosity, pore dimensions and surface characteristics significantly affect heterogeneous-catalyzed hydrogenations. Typically, the majority of pore diameters referred to in heterogeneous catalyst references are calculated based upon the relationship that the pore diameter is substantially equivalent to the ratio of the pore volume to the surface area. Thus, assuming cylindrical pores, the pore diameter can be calculated in accordance with the equation $$PD \text{ (Pore Diameter)} = \frac{40,000 \times \text{Pore Volume (cc/g)}}{\text{Surface Area (m}^2\text{/g)}}$$

It so happens that the calculated pore diameter is always larger than the actual measured pore diameter and the difference can and does significantly affect the performance of the heterogeneous catalyst. This difference between calculated and actual or measured pore diameters is exemplified by a Davison LSA alumina support having a pore volume of 0.89 cc/gm and a surface area of 160 m²/gm. Using the above equation for pore diameter (in angstroms), this support has a calculated pore diameter of (40,000)(0.89) 160 angstroms or 222.5 angstroms. By porosimetry analysis following ASTM D-4284-83, 86.7% of the total surface area occurs in pores having diameters in the range from 60 to 139 angstroms, which is substantially less than the calculated value of 222.5 angstroms. The values specified for the heterogeneous catalyst supports of this invention are actual as opposed to calculated.

The various properties of the catalysts of this invention were measured by the following methods:

The average particle diameter of the support was determined from a particle diameter distribution curve prepared on the basis of its optical or electron micro photograph.

The specific surface area of the support was calculated by the BET (Brunauer-Emmett-Teller) method from the amount of nitrogen absorption measured by a low-temperature nitrogen absorption method. A particular procedure for determining surface area of catalysts is defined by ASTM D-3663-84.

The average pore diameter and pore volume of the support were measured by using a mercury porosimeter following the procedure of ASTM D-4284-83.

The degree of hydrogenation of the carbon-carbon double bonds was measured by an iodine value method.

It should be noted that the pore diameters are volume weighted pore diameter, i.e., the pores make up most of the volume, rather than surface weighted pore diameters, i.e., the pores make up the bulk of the surface area.

The metal surface area was measured by the chemisorption technique described in J. LeMaitre et al, "Characterization of Heterogeneous Catalysts", Francis Delannay ed., Marcel Dekker, New York (1984), pp. 310–324. Metal surface area of catalysts can also be determined by chemisorption following the procedure of ASTM D-3908-2.

The catalytic metals used for these applications depend upon the exact nature of the material being hydrogenated. Generally, the catalytic materials will be taken from the metals of Grou VIII of the periodic table with palladium, rhodium, ruthenium, cobalt, nickel and platinum being particularly preferred. The catalyst can be made from any compound containing these elements or any combination of these elements. Promoters can also be added to these catalysts to further enhance their selectivity in some reactions.

The heterogeneous catalysts of the invention can be prepared by forming a dispersion or solution of the catalytic metal or a metal compound such as a metal salt in an appropriate solvent media, such as water or an alcohol, combining the solution or dispersion of metal with the support material and removing solvent media to obtain a composite of the support and metal or metal compound. Representative nonaqueous diluents include the lower alkanols having up to 5 carbon atoms, such as methanol, ethanol, propanol and the like.

After impregnation of the support from a nonaqueous solution of hydrogenation metal or metal components, excess diluent is removed and the impregnated support is activated by reducing at an elevated temperature and for a period of time sufficient to convert substantially all of the metal to active metal. The activation step is typically carried out by contacting the composite with a reducing gas comprising hydrogen. The reducing gas can be conveniently diluted with an inert gas such as nitrogen. The temperatures at which the activation takes place are typically in the range from about 150° C. to about 500° C., more preferably about 200° C. to about 400° C. After activation, the heterogeneous catalyst will contain a metal surface area based on the total surface area of the catalyst support, in the range from 7–75%, preferably 10–50%.

The catalysts of this invention can be employed for the hydrogenation of any unsaturated organic compound, including both monomeric and polymeric compounds. It is particularly suited for the hydrogenation of unsaturated polymeric material, particularly such polymers having molecular weights in the range from 50,000 to 500,000, and especially 150,000 to 500,000, and most typically 175,000. An especially attractive use for the heterogeneous catalyst systems of the invention is in the hydrogenation of high molecular weight unsaturated polymers which contain both ethylenic unsaturation and aromatic unsaturation because of their ability to hydrogenate substantially all of the ethylenic unsaturation without causing significant reduction in the aromatic portion of the polymer. Typically, the catalysts of this invention provide from 90–100% conversion of the ethylenic unsaturation and will cause less than a 25%, and usually in the range from 0–7%, conversion of the aromatic unsaturation.

The catalysts of the invention are effective for the selective hydrogenation of the carbon-carbon ethylenic bonds in a copolymer of a conjugated diene and one or more copolymerizable monomers by a process which comprises hydrogenating the unsaturated polymer at a temperature in the range from about 50° to about 150° C. and at a pressure of hydrogen in the range from about 50 to about 1,250 psig. The practice of the invention is particularly suitable for use with polymers containing olefinic unsaturation, which can be either quenched or living polymers. Preferably, the olefin-containing polymer feeds are diene-containing polymers and copolymers with vinyl aromatic/diene copolymers being most preferred.

Useful diene moieties include any conventional polyunsaturated monomers having from about 3 to about 12 carbon atoms. Butadiene is preferred. Useful aromatic monomers include mono- and polyvinyl-substituted aromatic compounds. Styrene, alpha-methylstyrene, acrylonitrile, metha-acrylonitrile and divinyl benzene are currently preferred monomers. Mixtures of vinyl aromatic and/or diolefin monomers can be used along with the optional inclusion of conventional olefinic monomers of other types in the preparation of the olefin-containing polymers. Specific examples of olefinic unsaturated polymers include polyisoprene, polybutadiene, styrene-butadiene copolymer, acrylonitrile-butadiene copolymers, acrylonitrile-styrene-butadiene copolymers, styrene-isoprene-styrene triblock copolymers and styrene-butadiene-styrene triblock copolymers.

The olefin-containing polymer may be hydrogenated as such. Preferably, the polymer is used in the form of a solution. The concentration of the polymer solution is 1 to 70% by weight, preferably 1 to 40% by weight. Any solvent which does not adversely affect the catalyst and can dissolve the polymer to be hydrogenated may be used to provide the polymer solution. There may usually be employed benzene, toluene, xylene, decalin, hexane, cyclohexane, tetrahydrofuran, acetone, methyl ethyl ketone, ethyl acetate and cylcohexanone. When the polymer is prepared by a solution-polymerization method, the resulting solution may be used as such for hydrogenation.

After hydrogenation, the heterogeneous catalyst is separated from the solution of the hydrogenated polymer by conventional methods such as precipitation, centrifugal separation or filtration. The hydrogenated polymer is then separated from the solution by usual methods for recovering a polymer from a polymer solution. For example, the separation can be effected by steam precipitation method which comprises contacting the polymer solution directly with steam, a drum drying method which comprising dropping the polymer solution onto a heated rotating drum to evaporate the solvent, or a method which comprises adding a nonsolvent to the polymer solution to precipitate the polymer. Hydrogenated polymers so separated from the solution are then subjected to a drying step involving water removal, hot air drying, vacuum drying or extrusion drying and then recovered as a solid product.

The resulting hydrogenated polymeric materials can be used in a wide range of applications because of their excellent weatherability, ozone resistance, thermal stability and cold resistance.

The following examples illustrate the present invention more specifically. It should be understood that the invention is not limited to these examples.

EXAMPLE 1

Preparation And Use Of A Rhodium-Diatomaceous Earth Catalyst

An impregnating solution was prepared by dissolving 1.25 grams of hydrated rhodium trichloride in 34 mL of water. This solution was added to 10 grams of dried diatomaceous earth support (Johns Manville Celite ® F.C.) having a mean particle size of 5 microns, a surface area of 2.5–3.5 square meters per gram, a pore volume of 1.8 centimeters per gram and a pore distribution wherein 1% of the pores have a pore diameter in the range of 1,000–10,000 angstrom units and 99% of the pore diameters are greater than 10,000 angstroms. The impregnated support was then dried and reduced to provide a catalyst having a rhodium concentration of 5% by weight. Hydrogen chemisorption gave a value of 0.77 H/Rh which corresponds to a metal surface area of 1.7 $m^2/g$ of catalyst or 33 $m^2/g$ of Rh. The metal surface area was 70.8%. A 2 gram sample of the heterogeneous catalyst was added to a reactor containing 15 grams of a styrene-butadiene-styrene triblock copolymer (Shell Kraton ® D-1102) dissolved in 200 mL of cyclohexane. The hydrogenation was carried out at about 97° C. for 16 hours at 750 psig. The resulting copolymers showed greater than 95% hydrogenation in the olefin region and about 15% hydrogenation in the aromatic region.

EXAMPLE 2

Preparation And Use Of A Palladium On Diatomaceous Earth Heterogeneous Catalysts An impregnating solution was prepared by dissolving 0.83 grams of palladium chloride in 34 mL of water. This solution was added to 10 grams of the same diatomaceous earth support employed in Example 1. The impregnated support was then dried and reduced to provide a catalyst having a palladium concentration of 5% by weight. Hydrogen chemisorption gave a value of 0.038 H/Pd which corresponds to a metal surface area of 0.85 $m^2/g$ of catalyst or 17 $m^2/g$ of Pd. The metal surface area was 35.4%. A 1 gram sample of the catalyst was added to a reactor containing 17 grams of a styrene-isoprene-styrene triblock copolymer (Shell Kraton ® D-1107) dissolved in 255 mL of cyclohexane. The hydrogenation was carried out at 90° C. for 20 hours and the resulting polymer showed 92% hydrogenation of the olefin present and 1% hydrogenation of the aromatic region.

EXAMPLE 3

Effect Of Metal Surface Area On Catalyst Activity

A 5% platinum on diatomaceous earth (Johns Manville Celite ® F.C.) catalyst was made following the procedure of Example 2 employing hexachloroplatinic acid as the precursor. The support had a mean particle size of 5 microns and a surface area of 2.4 $m^2/g$. Hydrogen chemisorption gave a value of 0.1 H/Pt which corresponds to a metal surface area of 1.3 $m^2/g$ of catalyst or 26 $m^2/g$ of Pt. The metal surface area was 54%. One gram of this catalyst was used to hydrogenate 17 grams of a styrene-isoprene-styrene triblock copolymer dissolved in 260 mL of cyclohexane at 83° C. for 16 hours. The resulting polymer showed 97% olefin hydrogenation and 6% hydrogenation of the aromatic region.

A similar catalyst was made using the sam support and the same platinum precursor but the Pt concentration was 0.1%. Hydrogen chemisorption of this catalyst gave a value of 0.38 H/Pt which corresponds to a metal surface area of 0.094 m$^2$/g. The metal surface area was 3.9% Fourteen grams of this catalyst were used to hydrogenate 17 grams of the same copolymer under the sam conditions. The resulting polymer showed only 8% olefin hydrogenation.

The data show that the activity of catalysts with the same total metal surface $$(1.0 \text{ g})(1.3 \text{ m}^2/\text{g}) = 1.3 \text{ m}^2 = (14 \text{ g})(0.094 \text{ m}^2/\text{g})$$

is significantly affected by the percent surface coverage.

EXAMPLE 4

A Comparative Example Employing Catalysts Having A Pore Distribution Outside The Invention Catalyst 4-1: A commercially available activated carbon (Calgon CAL) having a surface area of 825 m$^2$/g, a pore volume of 0.64 mL/g, an average pore diameter of 18 angstroms and mean particle size of 10 microns was impregnated with an aqueous solution of palladium chloride and then reduced to give a catalyst having a palladium concentration of 5% by weight.

Catalyst 4-2: A commercially available alumina (Davison Low SA) having a surface area of 125 m$^2$/g, a pore volume of 0.9 mL/g, an average pore diameter of 288 angstroms and a mean particle size of 20 microns was impregnated with an aqueous solution of palladi. and then reduced to give a catalyst having a palladi concentration of 1% by weight.

Catalyst 4-3: A commercially available silica (Davison Grade 57) having a surface area of 157 m$^2$/g, a pore volume of 1.04 mL/g, an average pore diameter of 266 angstroms and a mean particle size of 20 microns was impregnated with an aqueous solution of palladium chloride and then reduced to give a catalyst having a palladium concentration of 1% by weight.

Catalyst 4-4: A commercially available copper chromite catalyst (Harshaw 0202) having a surface area of 48 m$^2$/g, a pore volume of 0.19 mL/g, an average pore diameter of 158 angstroms and a mean particle size of 20 microns.

A two gram sample of each catalyst was added to individual solutions containing 15 grams of a styrene-isoprene-styrene triblock copolymer (Shell Kraton ® D-1107). In each case, the hydrogenation was carried out at 750 psig for 20 hours at 90° C. The results are as follows:

| Catalyst | % Olefin Hydrogenation |
| --- | --- |
| 4-1 | 3% |
| 4-2 | 5% |
| 4-3 | 7% |
| 4-4 | less than 1% |

The data demonstrate that catalysts having pore size distributions such that more than 80% of the pores have diameters below 500 angstroms are ineffective in hydrogenating higher molecular weight unsaturated polymers.

EXAMPLE 5

The catalyst of Example 2 was used to hydrogenate 15 grams of polybutadiene dissolved in 250 m$^2$ of cyclohexane. The hydrogenation was carried out at 75° C. for 4 hours at 750 psig using 1 gram of the catalyst. The resulting polymer showed 99% olefin hydrogenation.

EXAMPLE 6

An aluminum oxide support (Rhone-Poulenc SCM-9X) having a surface area of 10–15 m$^2$/g, a pore volume of 0.7 cc/g, a pore distribution wherein 5% of the pores have a pore diameter in the range from 500 to 1,000 angstroms, 80% of the pores have a pore diameter in the range of 1,000 to 10,000 angstroms and 15% of the pores have a pore diameter greater than 10,000 angstroms and an average particle size of about 25 microns was impregnated with an aqueous solution of hexachloroplatinic acid, dried and reduced to provide a catalyst having a platinum concentration of 5% by weight. Hydrogen chemisorption gave a value of 0.088 H/Pt which corresponds to a metal surface area of 1.1 m$^2$/g of catalyst or 21 m$^2$/g of Pt. The metal surface area of this catalyst was 9%. A 1.5 gram sample of the thus-prepared heterogeneous catalyst was added to a reactor containing 17 grams of a styrene-isoprene-styrene triblock copolymer (Shell Kraton ® D-1107) dissolved in 250 grams of cyclohexane. The hydrogenation was carried out at 88° C. for 20 hours at 750 psig. The resulting polymer showed 91% olefin hydrogenation and 25% aromatic hydrogenation.

The embodiments of the invention in which an exclusive property or privilege is claimed are defined as follows.

1. A process for the hydrogenation of unsaturated polymeric materials comprising contacting at least one unsaturated polymeric material having a molecular weight of at least 50,000 and at least one carbon-carbon double bond with hydrogen in the presence of a catalyst comprising at least one Group VIII metal impregnated on a porous support, said support having a pore size distribution such that at least 95% of the pore volume is made up of pores having diameters greater than 450 angstroms, and the ratio of the metal surface area of said catalyst to the carrier surface area is in the range 0.07 to 0.75:1.

2. A process in accordance with claim 1 wherein the ratio of the metal surface area of said catalyst to the carrier surface area is in the range of 0.1 to 0.5:1.

3. A process according to claim 1 wherein said support has a pore size distribution such that at least 90% of the pore volume is made up of pores having diameters greater than 1,000 angstroms.

4. A process in accordance with claim 3 wherein the ratio of the metal surface area of said catalyst to the carrier surface area is in the range of 0.1 to 0.5:1.

5. A process in accordance with claim 1 wherein said Group VIII metal is palladium.

6. A process in accordance with claim 1 wherein said Group VIII metal is platinum.

7. A process in accordance with claim 1 wherein said Group VIII metal is rhodium.

8. A process in accordance with claim 1 wherein said porous carrier comprises diatomaceous earth.

9. A process in accordance with claim 8 wherein said diatomaceous earth has a pore size distribution such that at least 90% of the pore volume is made up of pores having diameters greater than 10,000 angstroms.

10. A process in accordance with claim 1 wherein said porous carrier comprises alumina.

11. A process in accordance with claim 10 wherein said alumina has a pore size distribution such that at least 90% of the pore volume is made up of pores having diameters greater than 1,000 angstroms.

12. A process in accordance with claim 1 wherein said porous carrier material comprises activated carbon.

13. A process in accordance with claim 12 wherein said activated carbon is characterized by pore size distribution such that at least 90% of the pore volume is made up of pores having diameters greater than 500 angstroms.

14. A process in accordance with claim 1 wherein said unsaturated polymeric material is characterized by the presence of at least one aliphatic carbon-carbon double bond and at least one aromatic ring.

15. A process in accordance with claim 14 wherein said polymeric material comprises polybutadiene.

16. A process in accordance with claim 1 wherein said unsaturated polymeric material comprises a styrene-butadiene copolymer.

17. A process in accordance with claim 1 wherein said polymeric material comprises a styrene-butadiene-styrene triblock copolymer.

18. A process in accordance with claim 1 wherein said unsaturated polymeric material comprises a styrene-isoprene-styrene triblock copolymer.

* * * * *